C. C. CHAMBERLAIN.
TIRE SPLICING MANDREL.
APPLICATION FILED APR. 12, 1911.
1,011,155.
Patented Dec. 12, 1911.
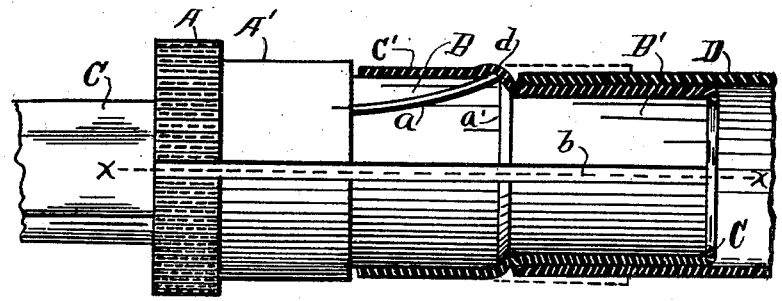
Fig. 1.
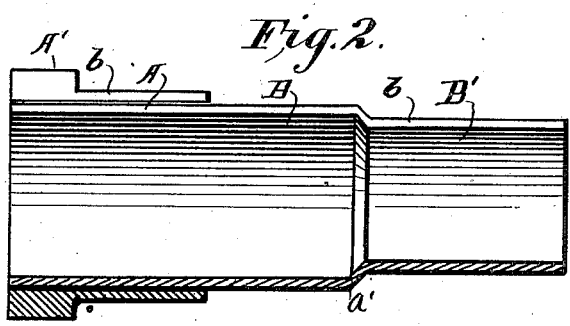
Fig. 2.
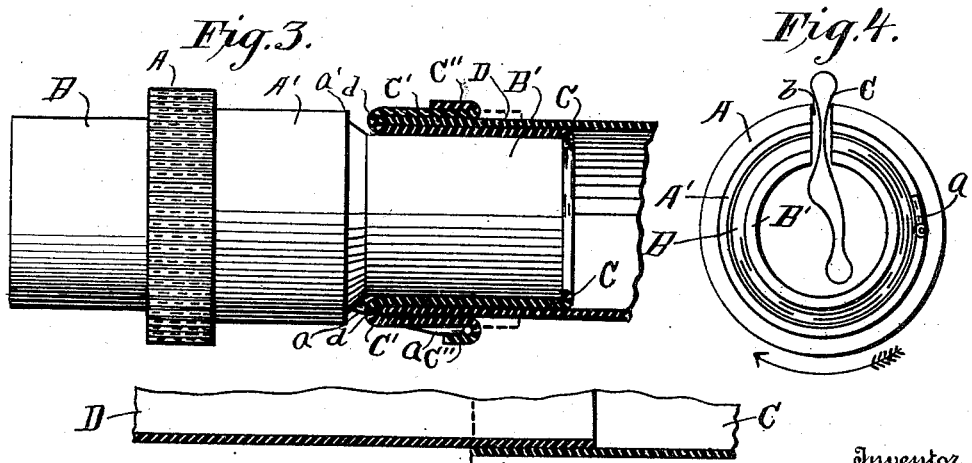
Inventor
Chauncey C. Chamberlain
By [signature]
Attorney
Witnesses
[signatures]

UNITED STATES PATENT OFFICE.

CHAUNCEY C. CHAMBERLAIN, OF IONIA, MICHIGAN.

TIRE-SPLICING MANDREL.

1,011,155.   Specification of Letters Patent.   Patented Dec. 12, 1911.

Application filed April 12, 1911. Serial No. 620,686.

*To all whom it may concern:*

Be it known that I, CHAUNCEY C. CHAMBERLAIN, a citizen of the United States, residing at Ionia, in the county of Ionia and State of Michigan, have invented certain new and useful Improvements in Tire-Splicing Mandrels, of which the following is a specification.

My invention relates to improvements in appliances for splicing the inner tubes of automobile tires, and its objects are: First, to provide an implement that will make the splice in such a manner that all air will be forced from between the surfaces cemented together. Second, to provide an implement that will make the splice perfectly smooth and even, and, third, to provide an implement that will form a mandrel upon which the tube may be left to dry so that the splice will be perfectly smooth and even. I attain these objects by the mechanism illustrated in the accompanying drawing in which,—

Figure 1 is a plan of the implement with two pieces of tubing shown thereon in section to show the manner of placing them on the implement preparatory to making the splice. Fig. 2 is a longitudinal section of the implement on the line $x$—$x$ of Fig. 1. Fig. 3 is a plan of the implement with the sleeve in the position it is carried to when the splice is about to be completed. Fig. 4 is an end view of the implement showing how a tube may be removed after the splice is made, and, Fig. 5 is a sectional view of two pieces of inner tube as they appear when properly spliced.

Similar letters refer to similar parts throughout the several views.

This implement consists of a mandrel made with a large body B, a small neck B' and a sharp shoulder $a'$ on the line of demarcation between the body and the neck. Upon this mandrel I place a sleeve A A' which has a finger $a$ securely attached to or integral with the smaller portion and extending out toward the shoulder $a'$ of the mandrel. The part A of the sleeve is designed as a hand grip with which to grip the sleeve and turn it around on the mandrel. I form a slot $b$ through one side of both the mandrel and the sleeve so that when the tube has been properly spliced into an endless tube, it may be folded or flattened, as indicated in Fig. 4, and passed out of the implement.

When a splice is to be made, one pieces of the tube, C is passed through the mandrel and the end is folded back over the end of the neck of the mandrel and thence over the shoulder $a'$ and for a distance over the body B, with the finger $a$ under it, as indicated in Fig. 1. The other piece of tubing is then passed over the neck B' of the mandrel, and the part of the tube that covers this neck, and cement placed upon the end of the piece D of tube and on the part of the tube $c'$ that covers the body B of the mandrel. When this has been done I clasp the hand grip A and the tube D and turn the sleeve in the direction of the arrow in Fig. 4, and, at the same time, I press the sleeve so that it will move gradually lengthwise of mandrel so that the annular and longitudinal movement of the finger will force the end $c'$ back over the end of the tube D, as indicated by the dotted lines in Fig. 1 and as shown in Fig. 3, and when the finger $a$ has reached the position shown in Fig. 3 the ends C" will drop over to the position indicated by the dotted lines in this figure.

The difference in the diameter of the body B and the neck B' should be such that when the tubes are placed as in Fig. 1 and the end of the tube C is being forced back over the end of the tube D the finger $a$ will press snugly upon the surface of the tube as it folds over so that the two surfaces will be pressed firmly together so as to force all air from between the surfaces of the tubes by the very gradual movement of the end of the tube C as it is forced along by the finger $a$, and thus positively insure the perfect cohesion of the parts, and after the parts have been properly placed the tubes are left on the mandrel until the cement has had time to dry thoroughly. By this means it is obvious that a perfectly smooth and substantial splice will have been made.

When the splice has become thoroughly set I remove the tube from the neck of the mandrel by pulling upon the part D which straightens the part C out, as indicated in Fig. 5 so that the end C" of the part C will be outside of the end of the part D with a long perfect lap between them.

The implement so far described is for use upon endless tubes, where there would be no chance to draw the tube out of the mandrel, hence it must be removed, after completing a splice, by passing it out through the slots $b$ as hereinbefore stated, but if it should so occur that it should be desired to only make a splice upon the end, or in the body of a "lapped tube" the slot could be dispensed with, though I would not recommend the making of these implements without the slot as its use would then be limited to special work, while the slotted implement may be used upon any tube, whether an endless annular tube or a lap tube, such as are now used extensively in bicycle tires.

What I claim as new, and desire to secure by Letters Patent of the United States, is:

1. In an implement for splicing inner tubes of pneumatic tires, a mandrel having a large body, a small neck and an abrupt shoulder at the line of demarcation between the body and the neck, a sleeve mounted on the body of the mandrel, and a finger projecting from one end of said sleeve along the surface of the body of the mandrel.

2. In an implement for splicing inner tubes for pneumatic tires, a hollow mandrel having a large portion and a small portion and a slot through one side the entire length, a sleeve mounted to turn and slide freely on the large portion of the mandrel and having a slot through one side to register with the slot in the mandrel, and a finger extending from one end of the sleeve along the surface of the mandrel, as and for the purpose set forth.

3. In an implement for splicing inner tubes for pneumatic tires, a hollow mandrel having a slot through one side one end of said mandrel being of large diameter and the other end being of smaller diameter forming a shoulder between them equivalent to three times the thickness of a tube, a sleeve revolubly mounted on the large end of the mandrel and having a slot through one side, a finger extending from one end of the sleeve along the surface of the mandrel to the shoulder, all so arranged that a tube may be passed through the mandrel and one end folded back over the small portion and up onto the large portion and over the finger, and another tube may be passed over the first tube and the small portion of the mandrel, and the sleeve may be made to revolve and slide endwise on the mandrel so that the finger will fold the end of one tube over the end of the other tube and force all air from between them.

Signed at Grand Rapids Michigan March 31, 1911.

CHAUNCEY C. CHAMBERLAIN.

In presence of—
R. L. WILLIAMS,
I. J. CILLEY.

---

Copies of this patent may be obtained for five cents each, by addressing the "Commissioner of Patents, Washington, D. C."